United States Patent Office 3,709,831
Patented Jan. 9, 1973

3,709,831
PREPARATION OF ACID-AMIDE MIXTURES
USEFUL AS SOLVENTS
Guy A. Crossley, Sycamore Township, Hamilton County, and David C. Heckert, Oxford, Ohio, assignors to The Procter & Gamble Company, Cincinnati, Ohio
No Drawing. Filed June 16, 1971, Ser. No. 153,846
Int. Cl. B01f 1/00
U.S. Cl. 252—364       8 Claims

ABSTRACT OF THE DISCLOSURE

Process for preparing mixtures of carboxylic acids and amides in the presence of water comprising reacting an amine hydrohalide with a carboxylic acid using certain catalysts, especially phosphoric acid. The resulting acid-amide mixtures are useful as solvents for the preparation of vicinal glycols; alternatively, the acid-amide mixtures can be refined to provide pure amides useful in preparing glycols.

BACKGROUND OF THE INVENTION

The present invention relates to a process for preparing acid-amide mixtures by condensing amine hydrohalides with carboxylic acids in the presence of certain catalysts. The resulting acid-amide mixtures are useful as solvents for the preparation of vicinal glycols in the manner described in the copending application of Heckert, entitled "Preparation of Vicinal Glycols From Dihalides in Azeotropic Media," Ser. No. 92,893, filed Nov. 25, 1970. Alternatively, the acid-amide mixtures can be refined to provide pure amides which can be used to prepare glycols as described in the copending application of Heckert, entitled "Preparation of Vicinal Glycols From Vicinal Dihalides," Ser. No. 51,024, filed June 29, 1970.

The preparation of vicinal glycols using carboxylic acid-amide or amide solvents in the manner described in the foregoing references results in the decomposition of the amide component of said solvents and the formation of mixtures comprising a carboxylic acid, an amine hydrohalide and water. Since amides are relatively expensive solvents, it is necessary for economic reasons that the spent solvents be regenerated and re-used. Furthermore, the economics of the situation dictate that it is not feasible to separate the amide decomposition mixture of water, amine hydrohalide and acid formed in the glycol process into its components prior to amide regeneration. Therefore, a process is required whereby acid-amide mixtures can be prepared from feedstocks comprising mixtures of a carboxylic acid, an amine hydrohalide and water.

The preparation of amides from organic acids and amines is a process well-known to those skilled in the chemical art. However, experimentation has indicated that heating a mixture comprising a carboxylic acid and an amine hydrohalide results in an incomplete conversion of the reactants into the desired amide product. Furthermore, the use of excessive heat is such processes in an attempt to force the reaction to completion often results in decomposition of the reactants. For this reason, various catalysts designed to promote the condensation of carboxylic acids and amines to form amides have been suggested in the art. For example, Dalev et al., Nauch. Trudove Visshiya Med. Inst. Sofiya 5, No. 3, 9–11 (1959) disclose the use of phosphorus pentoxide to condense certain dialkylamines with nicotinic acid using a benzene solvent. Klosa, J. Prakt. Chem. 19, No. 1–2, 45–55 (1962) discloses the use of phosphorus oxychloride to condense primary amines with carboxylic acids, again using organic, non-aqueous solvents. J. Kopecky et al., Chem. Ind. (London) 1966 (36), 1529–30 disclose the use of hexamethylphosphoramide in conjunction with a Lewis acid to prepare amides. German application 1,103,321, to Henkel (Apr. 27, 1954) discloses the reaction of aliphatic carboxylic acids with primary or secondary amines in the presence of phosphorus oxychloride and a non-aqueous solvent. U.S. Pat. 2,694,072, to W. Von Glahn et al. (No. 9, 1954) discloses the use of phosphorus trichloride or phosphorus oxychloride to condense amines with carboxylic acids using a tertiary amine as the reaction solvent. From the foregoing it may be seen that each of the prior art processes relating to the preparation of amides per se are carried out in non-aqueous media. For this reason, the prior art processes are not particularly suited for use on an industrial scale in that the use of large quantities of flammable organic solvents is generally undesirable in large scale processes. Furthermore, the prior art amide processes require anhydrous conditions, while it is necessary herein to be able to prepare acid-amide mixtures from acid-amine hydrohalide feedstocks containing relatively high proportions of water for the reasons noted above.

The present invention uses certain phosphorus compounds or sulfuric acid as catalysts in the condensation of carboxylic acids with amine hydrohalides to form the desired carboxylic acid-amide mixtures. The process of this invention is readily accomplished in the presence of water and there is no need to resort to the use of organic solvents or anhydrous reaction conditions. Hence, the present invention is desirable both from a safety and an economic standpoint.

It is therefore an object of this invention to provide a process for preparing carboxylic acid-amide mixtures by condensing a carboxylic acid with an amine hydrohalide in the presence of certain phosphorus compounds of the type hereinafter detailed, or sulfuric acid, without organic solvents and in the presence of water. This and other objects are obtained by the present invention as will become apparent from the following disclosure.

SUMARY OF THE INVENTION

The present invention encompasses a process for preparing carboxylic acid-amide mixtures in the presence of water comprising: (1) admixing a catalytic amount of a member selected from the group consisting of phosphoric acid, phosphoric acid precursors, hexamethylphosphoramide, and sulfuric acid with an aqueous mixture comprising a primary or secondary amine hydrohalide and a carboxylic acid at a molar ratio of amine hydrohalide: carboxylic acid from about 1:1 to about 1:10; (2) distilling the mixture from step (1) at a temperature above about 180° C.; and (3) separating the distillate streams into a fraction comprising water and hydrogen halide and a fraction comprising a mixture of carboxylic acid and amide. The carboxylic acid-amide mixture obtained from this process is suitable for use per se as a reaction solvent for the preparation of glycols in the manner of Heckert, above, or can be further treated to separate the amide and carboxylic acid, thereby providing pure amide.

DETAILED DESCRIPTION OF THE INVENTION

The carboxylic acids useful in the present process include those acids which are used in the glycol processes of Heckert, above, or are present in the spent solvents obtained therefrom by virtue of amide decomposition. In general, such acids have the formula RCOOH wherein R represents hydrogen, alkyl, substituted alkyl, cycloalkyl, aryl and substituted aryl groups. For example, R can be $C_1$ to about $C_{20}$ alkyl as well as substituted alkyl wherein the substituents can be, for example, halogen, hydroxyl, alkyl, alkoxyl, nitro, aryl, thio, aldehyde, ketone, and the like. Carboxylic acids having one or more olefinic double bonds are also suitable herein. Exemplary carboxylic acids suitable for use in the present process include formic acid, acetic acid, propionic acid, butyric acid, pentenoic acid, decanoic acid, dodecenoic acid, eicosanoic acid, 2-chloroacetic acid, 2-bromoacetic acid, 2-iodoacetic acid, 3-methoxydecanoic acid, 20-fluoroeicosanoic acid, 4-iodobutanoic acid, 2-methoxyacetic acid, 2-ethoxyacetic acid, thioglycollic acid, 5-phenyldecanoic acid, 5-ethyldecanoic acid, 7-benzyldecanoic acid, perfluorooctanoic acid, benzoic acid, fluorobenzoic acid, nitrobenzoic acid, p- methoxybenzoic acid, 2,5-dimethylbenzoic acid, α-naphthanoic acid, 2-nitrodecenoic acid, cyclohexanecarboxylic acid, and the like. The preferred carboxylic acids used in the present process are formic acid, acetic acid, propionic acid and butyric acid.

The amine hydrohalides, i.e., hydrofluorides, hydrochlorides, hydrobromides, and hydroiodides, suitable for use in the present process include the hydrohalide salts of any of primary amines and secondary amines such as those formed by amide solvent decomposition during the aforementioned Heckert glycol processes. Such amine hydrohalides are of the general formula $RNH_2 \cdot HX$ and $R_2NH \cdot HX$, wherein R is as above and X represents halide. Alkyl, aryl and mixed alkyl-aryl primary and secondary amine hydrohalides are all suitable herein. For example, methylamine hydrochloride, dimethylamine hydrobromide, butylamine hydrochloride, dibutylamine hydrochloride, octylamine hydroiodide, dioctylamine hydrobromide, dodecylamine hydrochloride, bis-dodecylamine hydrofluoride, eicosylamine hydrochloride, bis-eicosylamine hydrofluoride, phenylamine hydrochloride, diplenylamine hydrobromide, di-p-tolylamine hydrochloride, p-chlorophenylamine hydrochloride, di-(p-chlorophenyl)amine hydrobromide, di-(m-nitrophenyl)amine hydrofluoride, ethylenediamine dihydrochloride, 1,3-propylenediamine dihydrobromide, and the like are all suitable for use in the preparation of amides by the present process. The hydrohalide salts of cyclic amines, e.g., morpholine hydrochloride, pyridine hydrobromide, quinoline hydrochloride, and 8-hydroxyquinoline hydrochloride are also suitable. In general, the hydrochlorides are the preferred hydrohalides herein for economic reasons. Especially preferred herein are dimethylamine hydrochloride, diethylamine hydrochloride, dipropylamine hydrochloride, and dibutylamine hydrochloride.

The condensation of the aforementioned carboxylic acids and amine hydrohalides to regenerate amides is carried out herein in the presence of certain catalysts, including phosphoric acid (in any of its forms, including "polyphosphoric" acid and the salts, especially alkali metal salts, thereof), hexamethylphosphoramide, and sulfuric acid. Other phosphorus compounds suitable for use herein include phosphorus pentoxide, phosphorus pentachloride and phosphorus oxychloride, but these serve merely as precursors for phosphoric acid since these phosphorus compounds are converted to phosphoric acid on contact with the water present in the acid-amine hydrohalide feedstocks used herein. All of the catalytic materials used herein are commercially available. Of the phosphorus compounds, phosphoric acid is most preferred since it is easier to work with than are the other phosphorus materials. If a non-acidic catalyst is desired, a hexaalkylphosphoramide (alkyl=$C_1$ to $C_5$), especially hexamethylphosphoramide, is preferred. Sulfuric acid offers cost advantages over phosphoric acid and is preferred in some applications for that reason. The catalysts herein are used at molar ratios of from about 0.001 to about 0.1, based on moles of amine hydrohalide.

The carboxylic acid-amine hydrohalide feedstocks used herein are conveniently those resulting from the Heckert glycol process, above. Such feedstocks contain the carboxylic acid and amine hydrohalide in ratios from about 0.1:1 to about 20:1. For the present purposes it is desirable to have at least one equivalent of carboxylic acid for each equivalent of amine hydrohalide so that no loss of amine will occur. If the feedstock does not contain sufficient acid, more can be added. An amine hydrohalide:carboxylic acid ratio of about 1:1 to 1:10 is preferred herein. Too much excess acid does not improve the process and is economically wasteful in that it has to be distilled. If excess acid is present, additional amine hydrohalide can be added to adjust the ratio.

The feedstocks used herein contain up to about 20% (wt.) water. The amount of water is immaterial to the present process, but, for economic reasons, it may be convenient to remove some of the water prior to distilling the final mixture of catalyst, amine hydrohalide and carboxylic acid. This can be done by flash evaporation, thereby precluding distilling excess water during the process and allowing smaller equipment to be used. For most purposes it is convenient to remove all but about 10% (wt.) of the water from the carboxylic acid-amine hydrohalide feedstock prior to use.

In general terms, the process of this invention is carried out by simply admixing the condensation catalyst and the aqueous mixture comprising the carboxylic acid and amine hydrohalide of the types hereinbefore disclosed in a reaction vessel fitted with a distilling column, take-off, head, etc. The reaction mixture is heated to a temperature above about 180° C. For most purposes it is desirable that the reaction temperature does not exceed about 225° C. since many of the amide products begin to decompose above that temperature. Most generally, a temperature from about 200° C. to about 220° C. is preferred herein. The distillate stream is separated into a water-hydrogen halide fraction, which is recovered at the top of the column, and a mixed acid-amide fraction, which is recovered as a side stream from the column.

The present process is more fully illustrated by the following examples which are included for illustrative purposes but are not intended to be limiting. Distillation times in the examples are only related to the volume of product being recovered and not to reaction rate. Shorter times (10 minutes to 1 hour) are suitable if less product is being recovered.

In the following examples the distillation of the carboxylic acid-amine hydrohalide mixtures is carried out in a fractional distillation apparatus comprising 3-neck distillation vessel fitted with a column which can be externally heated. The column is provided with intermediate take-off ports as well as a column head. Exit gases (hydrogen halides) are removed through the head and passed through a sodium hydroxide scrubber.

EXAMPLE I

Dimethylformamide regeneration

The distillation vessel was charged with a mixture comprising 200 g. of dimethylamine hydrochloride, 2.35 g. of 85% $H_3PO_4$ and 100 ml. of a feedstock comprising 19.9% (wt.) dimethylamine hydrochloride, ca. 71% formic acid, and water (balance). The distillation vessel was heated to 180° C. until refluxing began. Additional feedstock (19.9% dimethylamine hydrochloride; 71% formic acid; balance, water) was added to the distillation vessel over a period of 6 hours until a total of 977.13 g. of feedstock (including initial charge) had been added. Distillation continued during this time and the distillate was separated into two streams. A total of 158.3 g. of the aqueous fraction was taken overhead; 11.8 g. of HCl was collected in the caustic scrubber. The product fraction comprising 327.9 g. of a mixture of formic acid and dimethylformamide was removed from the column about one-third of the way up from the distillation pot. After distillation the pot contained 363 g. of residue. A material balance indicated that 1.93 gram moles of dimethylamine hydrochloride were consumed in this process and a total of 1.57 gram moles of dimethylformamide was formed (81% yield).

The above process is carried out at temperatures of 200° C. and 225° C., respectively, and equivalent results are secured.

In the above process the dimethylamine hydrochloride is replaced by an equivalent amount of dimethylamine hydrofluoride, dimethylamine hydrobromide and dimethylamine hydroiodide, respectively, and equivalent results are secured in that dimethylformamide is formed in high yield.

EXAMPLE II

Dimethylacetamide regeneration

The distillation vessel (above) was charged with 203.9 g. of dimethylamine hydrochloride and 2.8 g. of 85% phosphoric acid and the mixture was heated until liquid (ca. 194° C.). A total of 361 g. of feedstock comprising 22% (w./w.) dimethylamine hydrochloride and 78% glacial acetic acid was slowly added to the distillation vessel over a period of 3 hours; the temperature was maintained at 224° C.–230° C. The aqueous acid distillate (51.8 g.) was taken at the overhead of the column. 77.6 g. of HCl was collected in the caustic scrubber. The acetic acid-dimethylacetamide product was taken near the bottom of the column. A material balance indicated that 3.17 gram moles of dimethylamine hydrochloride were consumed in the process and a total of 2.9 gram moles of dimethylacetamide were formed; the total yield was 93%. A minor amount of methylacetamide was also recovered.

In the above process, aqueous feedstocks comprising 1:1 (mole) mixtures of dimethylamine hydrochloride and propionic acid; dimethylamine hydrochloride and benzoic acid; dimethylamine hydrochloride and decanoic acid; and dimethylamine hydrochloride and eicosanic acid, respectively, are used. The resulting product distillates comprise mixtures of propionic acid-dimethylpropionamide; benzoic acid-dimethylbenzamide; decanoic acid-dimethyldecanamide; and eicosanic acid-dimethyleicosanamide, respectively.

EXAMPLE III

Dimethylacetamide preparation

A mixture comprising 25 g. of dimethylamine hydrochloride, 40 ml. of acetic acid, 10 ml. of toluene and 1 ml. of sulfuric acid (about 15% total water in the mixture) was heated to reflux in a still with a 20-inch column packed with glass beads. The heating was continued for 12 hours with removal of about 30 ml. of acetic acid and toluene/water azeotrope. About midway through the distillation an additional 12 ml. of acetic acid was added to replace lost material. Total yield of dimethylacetamide, recovered as the dimethylacetamide-acetic acid azeotrope, was 80.7% (based on dimethylamine hydrochloride).

In the above procedure, the dimethylamine hydrochloride is replaced by an equivalent amount of diethylamine hydrochloride, dipropylamine hydrochloride, dibutylamine hydrobromide and diphenylamine hydrofluoride, respectively, and equivalent results are secured in that mixtures comprising acetic acid-diethylacetamide; acetic acid-dipropylacetamide; acetic acid-dibutylacetamide; and acetic acid-diphenylacetamide are secured, respectively.

EXAMPLE IV

Dimethylacetamide preparation

A mixture comprising 25 g. of dimethylamine hydrochloride, 40 ml. of acetic acid, 10 ml. of toluene and 1 ml. of hexamethylphosphoramide (about 10% total water) was heated to reflux in a still fitted with a 20-inch column packed with glass beads over a 12 hour period. Hydrogen chloride was vented from the top of the still during the distillation. About midway through the distillation, an additional 20 ml. of acetic acid was added to the still pot to compensate for losses. The product was recovered as the acetic acid-dimethylacetamide azeotrope. Yields were 24%, based on dimethylamine hydrochloride.

In the above process, the hexamethylphosphoramide is replaced by an equivalent amount of phosphorus pentoxide, phosphorus pentachloride, polyphosphoric acid, metaphosphoric acid and sodium tripolyphosphate, respectively, and equivalent results are secured in that the dimethylamine hydrochloride is converted to dimethylacetamide and recovered as an acetic acid-dimethylacetamide azeotrope.

In the above process the dimethylamine hydrochloride is replaced by an equivalent amount of methylamine hydrochloride, butylamine hydrochloride, decylamine hydrochloride, and isopropylamine hydrobromide, respectively, and the following mixtures are secured: acetic acid-methylacetamide; acetic acid-butylacetamide; acetic acid-decylacetamide; and, acetic acid-isopropylacetamide.

What is claimed is:

1. A process for preparing carboxylic acid-amide mixtures in the presence of water comprising: (1) admixing a catalytic amount of a member selected from the group consisting of phosphoric acid, phosphoric acid precursors, hexamethylphosphoramide and sulfuric acid with an aqueous mixture comprising a primary or secondary amine hydrohalide and a carboxylic acid at a molar ratio of amine hydrohalide:carboxylic acid from about 1:1 to about 1:10; (2) distilling the mixture prepared from step (1) at a temperature above about 180° C.; and (3) separating the distillate stream into a fraction comprising water and hydrogen halide and a fraction comprising a mixture of carboxylic acid and amide.

2. A process accordingly to claim 1 wherein the carboxylic acid is selected from the group consisting of formic acid, acetic acid, propionic acid and butyric acid.

3. A process according to claim 1 wherein the amine hydrohalide is selected from the group consisting of dimethylamine hydrochloride, diethylamine hydrochloride, dipropylamine hydrochloride and dibutylamine hydrochloride.

4. A process according to claim 1 which is carried out at a temperature from about 200° C. to about 220° C.

5. A process according to claim 1 wherein the catalyst is phosphoric acid.

6. A process according to claim 1 wherein the catalyst is hexamethylphosphoramide.

7. A process according to claim 1 wherein the catalyst is sulfuric acid.

8. A process according to claim 1 wherein the carboxylic acid is acetic acid, the amine hydrohalide is dimethylamine hydrochloride, the catalyst is phosphoric acid and the temperature is in the range from about 200° C. to about 220° C.

References Cited

UNITED STATES PATENTS

| 2,694,072 | 11/1954 | Von Glahn et al. | 260—561 R |
| 3,382,185 | 5/1968 | Wheeler et al. | 252—364 |
| 3,419,478 | 12/1968 | Izard | 260—561 R X |

RICHARD D. LOVERING, Primary Examiner

U.S. Cl. X.R.

106—311; 252—DIG 9; 260—561 B, 561 HL, 561 K, 561 N, 561 R, 561 S, 636